United States Patent
Sakamoto et al.

(10) Patent No.: US 12,417,049 B2
(45) Date of Patent: Sep. 16, 2025

(54) MANAGEMENT APPARATUS, METHOD OF PROCESSING DATA, RECORDING MEDIUM, METHOD OF MANUFACTURING SEMICONDUCTOR DEVICE, AND PROCESSING SYSTEM

(71) Applicant: Kokusai Electric Corporation, Tokyo (JP)

(72) Inventors: Yusuke Sakamoto, Toyama (JP); Kazuhide Asai, Toyama (JP); Kayoko Yashiki, Toyama (JP); Osamu Ueda, Toyama (JP); Shuai Yuan, Toyama (JP)

(73) Assignee: Kokusai Electric Corporation, Tokyo (JP)

( * ) Notice: Subject to any disclaimer, the term of this patent is extended or adjusted under 35 U.S.C. 154(b) by 0 days.

(21) Appl. No.: 17/686,152

(22) Filed: Mar. 3, 2022

(65) Prior Publication Data

US 2022/0300192 A1   Sep. 22, 2022

(30) Foreign Application Priority Data

Mar. 19, 2021   (JP) ................................. 2021-046690

(51) Int. Cl.
*G06F 3/06* (2006.01)
*H04L 67/568* (2022.01)

(52) U.S. Cl.
CPC .......... *G06F 3/0655* (2013.01); *G06F 3/0652* (2013.01); *G06F 3/0673* (2013.01); *H04L 67/568* (2022.05)

(58) Field of Classification Search
CPC .... G06F 3/0655; G06F 3/0652; G06F 3/0673; G06F 9/4881; H04L 67/568
(Continued)

(56) References Cited

U.S. PATENT DOCUMENTS 6,122,556 A  *  9/2000   Tochiori ............... G05B 19/409
                                                                    700/17
8,329,479 B2 * 12/2012  Asai ................... G05B 19/4183
                                                                    438/10
(Continued)

FOREIGN PATENT DOCUMENTS

JP         57-019846 A      2/1982
JP         04-312132 A     11/1992
(Continued)

OTHER PUBLICATIONS

Japanese Office Action issued on for Feb. 7, 2023 Japanese Patent Application No. 2021-046690.
(Continued)

*Primary Examiner* — Zhuo H Li
(74) *Attorney, Agent, or Firm* — Volpe Koenig

(57) ABSTRACT

There is provided a technique that includes: a first storage configured to store request data from a terminal apparatus; a second storage configured to store information from a processing apparatus; and a controller configured to be capable of searching one of the first storage and the second storage based on the received request data and acquiring information of the processing apparatus corresponding to contents of the request data by using at least one selected from the group of the first storage and the second storage.

19 Claims, 15 Drawing Sheets

(58) Field of Classification Search
CPC ..... H04L 67/1097; H04L 67/55; H04L 67/12; H01L 21/67276; G05B 19/408; G05B 19/418; G05B 23/02
See application file for complete search history.

(56) References Cited

U.S. PATENT DOCUMENTS

| | | | |
|---|---|---|---|
| 10,382,550 B2* | 8/2019 | Kipp | H04L 67/564 |
| 2002/0064138 A1* | 5/2002 | Saito | G05B 19/41865 370/282 |
| 2003/0188013 A1 | 10/2003 | Nishikado et al. | |
| 2008/0086229 A1* | 4/2008 | Ueda | G05B 19/41845 700/121 |
| 2008/0182345 A1* | 7/2008 | Sugishita | H01L 22/20 118/712 |
| 2008/0243296 A1* | 10/2008 | Asai | H04L 12/66 700/121 |
| 2009/0265322 A1* | 10/2009 | Asai | G05B 19/4183 |
| 2022/0179585 A1* | 6/2022 | Muthiah | G06F 3/0673 |

FOREIGN PATENT DOCUMENTS

| | | |
|---|---|---|
| JP | 09-248739 A | 9/1997 |
| JP | 2002-027567 A | 1/2002 |
| JP | 2003-122605 A | 4/2003 |
| JP | 2003-283556 A | 10/2003 |
| JP | 2008-277752 A | 11/2008 |
| JP | 2008-283169 A | 11/2008 |
| JP | 2010-219246 A | 9/2010 |
| JP | 2013-201299 A | 10/2013 |
| JP | 2015-060279 A | 3/2015 |
| JP | 2020-170411 A | 10/2020 |
| TW | 362242 B | 6/1999 |

OTHER PUBLICATIONS

Taiwan Office Action issued on Dec. 28, 2022 for Taiwan Patent Application No. 110149018.
Japanese Office Action issued on Jul. 25, 2023 for Japanese Patent Application No. 2021-046690.
Japanese Office Action issued on Dec. 26, 2023 for Japanese Patent Application No. 2021-046690.
Korean Office Action issued on Sep. 2, 2024 for Korean Patent Application No. 10-2022-0027157.

* cited by examiner

Terminal apparatus 6

FIG. 7

| Request data to apparatus | Priority |
|---|---|
| TK5 : Apparatus file list | 5 |
| TK4 : File acquisition from apparatus | 4 |
| TK2 : File transmission to apparatus | 2 |
| TK0 : Apparatus log file acquisition | 0 |

MANAGEMENT APPARATUS, METHOD OF PROCESSING DATA, RECORDING MEDIUM, METHOD OF MANUFACTURING SEMICONDUCTOR DEVICE, AND PROCESSING SYSTEM

CROSS-REFERENCE TO RELATED APPLICATION

This application is based upon and claims the benefit of priority from Japanese Patent Application No. 2021-046690, filed on Mar. 19, 2021, the entire contents of which are incorporated herein by reference.

TECHNICAL FIELD

The present disclosure relates to a management apparatus, a method of processing data, a recording medium, a method of manufacturing a semiconductor device, and a processing system.

BACKGROUND

In the related art, a substrate processing system including a plurality of substrate processing apparatuses that process substrates (semiconductor wafers), a management apparatus that monitors an operating status of the plurality of substrate processing apparatuses and stores the production history thereof, etc., a plurality of clients (terminal apparatuses) may be used in semiconductor device manufacturing factories.

When the plurality of clients (terminal apparatuses) connected to the substrate processing system simultaneously transmit request data requesting information acquisition to one substrate processing apparatus, the substrate processing apparatus may be overloaded. If such a request is processed sequentially as appropriate in order to avoid the overload on the substrate processing apparatus, a client response takes a long time, which may deteriorate the response of screen display of the client.

SUMMARY

Some embodiments of the present disclosure provide a technique capable of remotely monitoring a group of semiconductor manufacturing apparatuses operating in a plurality of factories.

Other issues and new features will become apparent from the description of the present disclosure and the accompanying drawings.

According to one embodiment of the present disclosure, there is provided a technique that includes: a first storage configured to store request data from a terminal apparatus; a second storage configured to store information from a processing apparatus; and a controller configured to be capable of searching one of the first storage and the second storage based on the received request data and acquiring information of the processing apparatus corresponding to contents of the request data by using at least one selected from the group of the first storage and the second storage.

BRIEF DESCRIPTION OF DRAWINGS

The accompanying drawings, which are incorporated in and constitute a part of the specification, illustrate embodiments of the present disclosure.

FIG. 7 is a diagram for explaining the priority of request data for a substrate processing apparatus.

DETAILED DESCRIPTION

Figure 1:
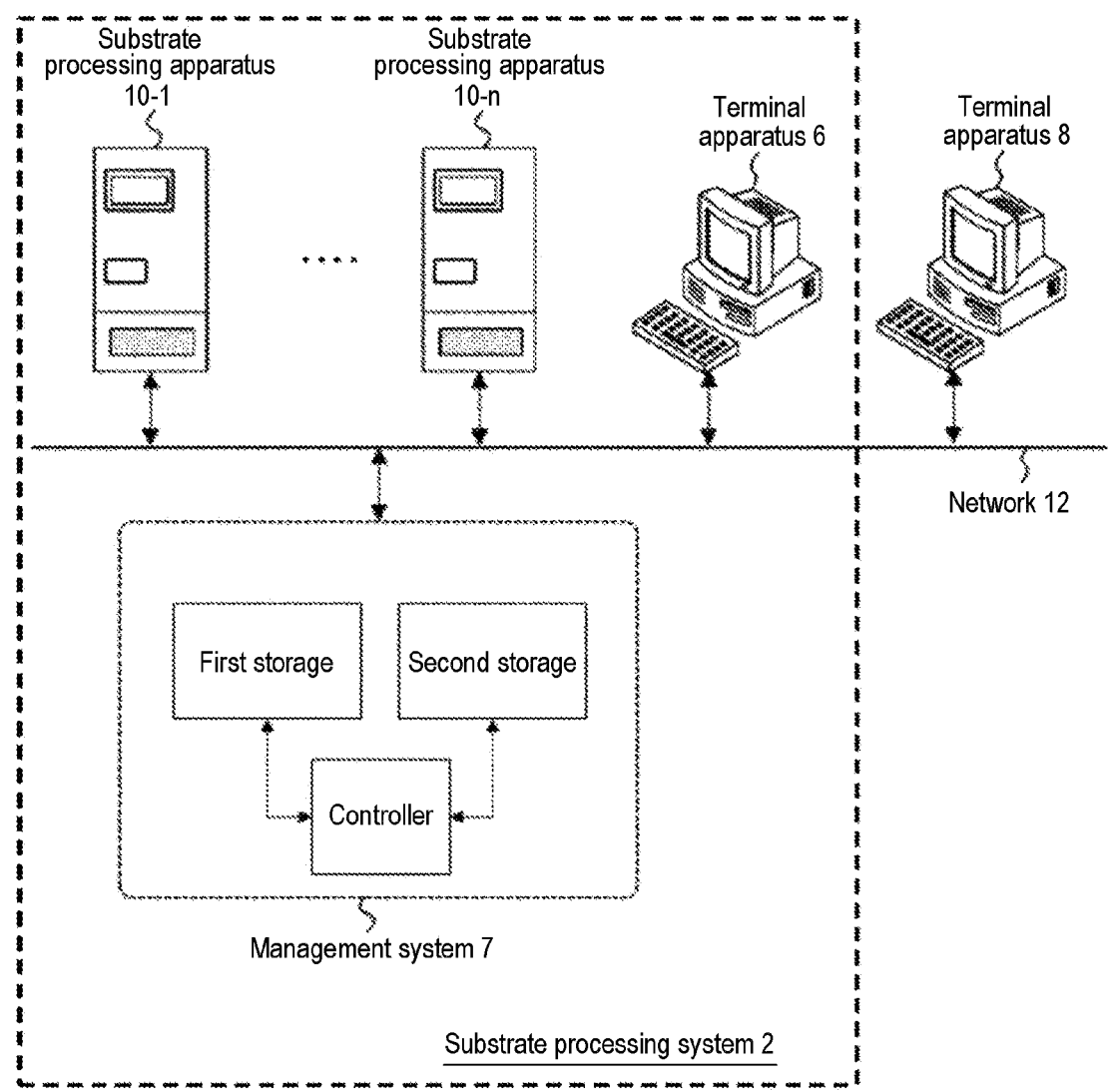
FIG. 1 is a diagram showing a configuration example of a substrate processing system according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments will be described with reference to the drawings. However, in the following description, the same constituent elements are denoted by the same reference numerals, and explanation thereof may not be repeated. Further, the drawings may be represented schematically as compared with actual aspects in order to clarify the description, which but are merely examples and do not limit the interpretation of the present disclosure. Further, the drawings used in the following description are schematic, and the dimensional relationship, ratios, and the like of various elements shown in figures do not always match the actual ones. Further, the dimensional relationship, ratios, and the like of various elements between plural figures do not always match each other.

In the present disclosure, a cache memory and a task queue can be configured as described below.

The cache memory is, for example, a high-speed storage device provided inside a controller such as a microprocessor, and stores frequently used data (or data used or accessed). When response data to request data issued from a terminal apparatus matches the data stored in the cache memory, by transmitting (sending) response data stored in the cache memory to the requesting terminal apparatus, access to a relatively low-speed main memory (main storage device) or a substrate processing apparatus can be reduced, thereby making it possible to speed up the response time of processing to the request data from the terminal apparatus. Here, the response data stored in the cache memory are information from a processing apparatus, for example, information about a substrate processing apparatus 10, and include at least substrate processing information (temperature information, pressure information, etc.), failure information, and event information of the substrate processing apparatus 10, which will be described later.

The task queue is one of the basic data structures of a computer, and holds request data such as tasks issued from a terminal apparatus in a first-in, first-out list structure. When fetching the request data from the task queue, the request data are fetched in order from request data put in first. Putting request data in the task queue is called enqueue or push, and fetching request data from the task queue is called dequeue or pop.

(Embodiments)
(Example of Overall Configuration of Substrate Processing System)

A substrate processing system 2 according to an embodiment of the present disclosure will be described. FIG. 1 is a diagram showing a configuration example of the substrate processing system 2 according to an embodiment of the present disclosure.

As shown in FIG. 1, the substrate processing system 2 includes a plurality of substrate processing apparatuses 10 (10-1 to 10-n), a first terminal apparatus 6 as a display device and an instruction device, and a management system 7 as a management apparatus. The substrate processing apparatus 10, the first terminal apparatus 6, and the management system 7 are connected via a network 12 such as a LAN or a WAN. Therefore, data are transmitted and received via the network 12 between the substrate processing apparatus 10 and the management system 7. Further, a second terminal apparatus 8 as a display device and an instruction device is connected to the substrate processing system 2 via the network 12. The first terminal apparatus 6 is a first client, and the second terminal apparatus 8 is a second client or a crossing connection client.

In the substrate processing system 2, each of the substrate processing apparatus 10, the management system 7, the terminal apparatus 6, and the terminal apparatus 8 is also referred to as hardware. Each configuration example in the substrate processing system 2 will be described with reference to FIGS. 3 to 6 as described later, and here, each hardware will be briefly described below.

The management system 7 stores configuration information of the substrate processing system 2. The configuration information includes the name of each hardware, the connection configuration of each hardware, and the like. The configuration information is used by a hardware to recognize its role and an association with other hardware. Further, the management system 7 accumulates information (shared information) shared by the entire substrate processing system 2. The shared information is information that occurs less frequently in the substrate processing apparatus 10 or information that occurs suddenly, and includes, for example, failure information and event information of the substrate processing apparatus 10.

The management system 7 communicates with at least one of the plurality of substrate processing apparatuses 10 based on the configuration information. The management system 7 receives information from the substrate processing apparatus 10, and transmits information about the substrate processing apparatus 10 to other hardware (for example, the terminal apparatus 6 and the terminal apparatus 8) in response to a request from the other hardware.

The management system 7 stores the information about the substrate processing apparatus 10. The management system 7 acquires and stores data (event information and process information) received from the substrate processing apparatus 10. The information is information having the high frequency of occurrence and including a large amount of data, such as temperature information and pressure information of the substrate processing apparatus 10.

The terminal apparatus 6 constitutes an interface (GUI: Graphical User Interface) that displays information accumulated by each hardware on a display screen and provides the information to a user. The terminal apparatus 6 receives a user's request via a key board, a mouse, or the like, acquires information related to the request from the corresponding hardware, and displays the acquired information on the display screen.

The terminal apparatus 8 is arranged at a position separated from the terminal apparatus 6. Similar to the terminal apparatus 6, the terminal apparatus 8 constitutes an interface (GUI) that displays information accumulated by each hardware on a display screen and provides the information to a user. A configuration example of the terminal apparatus 6 and the terminal apparatus 8 will be described later with reference to FIG. 3. The terminal apparatuses 6 and 8 are configured to be capable of acquiring the information on the substrate processing apparatus 10 by acquiring a file based on a request data, as will be described later.

The substrate processing apparatus 10 executes wafer (substrate) processing based on a process recipe or the like. Specifically, a sequence for processing the substrate is written in the process recipe, and the substrate processing apparatus 10 controls the components in the apparatus based on this sequence. The substrate processing apparatus 10 transmits data regarding the operating state of the apparatus itself, including temperature information, pressure information, fault information, etc., to the management apparatus 7 via the network 12. As an example, the substrate processing apparatus 10 is configured as a semiconductor manufacturing apparatus that implements a processing apparatus in a method of manufacturing a semiconductor device (IC). In the following description, an example will be described in which a vertical apparatus that performs an oxidation process, diffusion process, CVD process, and the like for the substrate is applied as the substrate processing apparatus.

(Configuration Example of Substrate Processing Apparatus)

Figure 2:
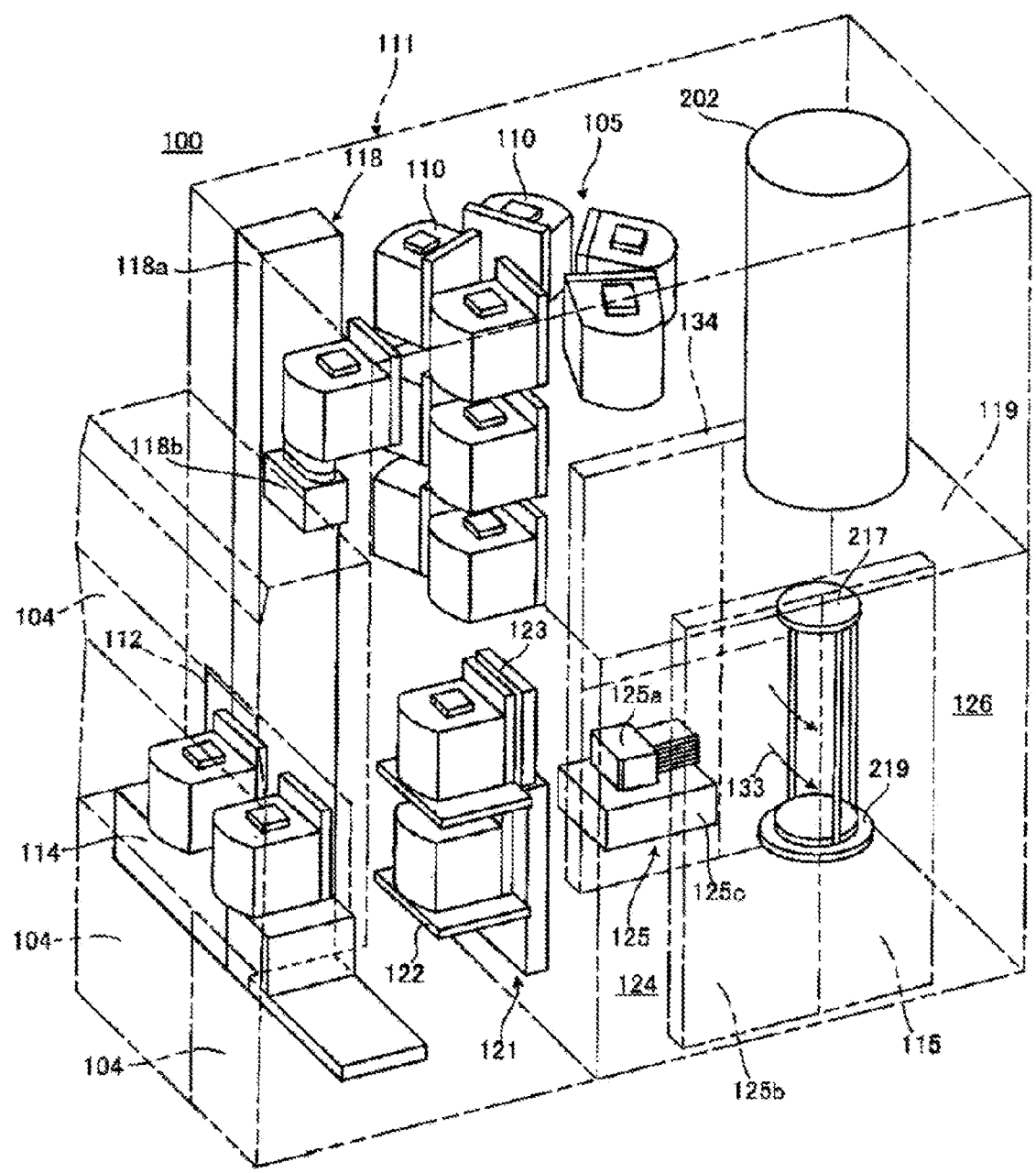
FIG. 2 is a perspective view of a substrate processing apparatus 10 according to an embodiment of the present disclosure.

Next, the detailed configuration of the substrate processing apparatus 10 will be described. FIG. 2 is a perspective view of the substrate processing apparatus 10 according to the embodiment of the present disclosure.

As shown in FIG. 2, the substrate processing apparatus 10 according to the embodiment of the present disclosure, in which a FOUP (Front Open Unified Pod) (substrate container; hereinafter referred to as a pod) 110 is used as a wafer carrier containing a wafer (substrate) 200 made of silicon or the like, includes a housing 111. In the forward front portion of the front wall of the housing 111, a front maintenance opening as an opening provided for maintenance is opened and front maintenance doors 104 for opening and closing the front maintenance opening are installed.

A pod loading/unloading port (substrate container loading/unloading port) 112 is provided on the front wall of the housing 111 so as to communicate with the inside and outside of the housing 111, and is opened/closed by a front shutter (substrate container loading/unloading mechanism). A load port (substrate container delivery stand) 114 is installed on the forward front side of the pod loading/unloading port 112, and is configured to mount and align the pod 110. The pod 110 is loaded onto the load port 114 by an in-process transfer device (not shown), and is unloaded from the load port 114.

A rotary pod shelf (substrate container mounting shelf) 105 is installed in the upper portion of the housing 111 at substantially a central portion in the front-rear direction, and is configured to store a plurality of pods 110. That is, the rotary pod shelf 105 has a post that is vertically erected and intermittently rotated in a horizontal plane, and a plurality of shelf boards (substrate container mounting tables) that are radially supported at respective positions of the upper, middle, and lower stages of the post. The plurality of shelf boards are configured to mount and hold a plurality of pods 110.

A pod transfer device (substrate container transfer device) 118 is installed between the load port 114 and the rotary pod shelf 105 in the housing 111. The pod transfer device 118 includes a pod elevator (substrate container elevating mechanism) 118a that can move up and down while holding the pod 110, and a pod transfer mechanism (substrate container transfer mechanism) 118b as a transfer mechanism. The pod transfer device 118 is configured to transfer the pod 110 between the load port 114, the rotary pod shelf 105, and a pod opener (substrate container lid opening/closing mechanism) 121 by continuous operation of the pod elevator 118a and the pod transfer mechanism 118b.

A sub-housing 119 is constructed over the rear end in the lower portion of the housing 111 at substantially the central portion in the front-rear direction. a pair of wafer loading/unloading ports (substrate loading/unloading ports), which are arranged vertically in two stages, for loading/unloading the wafer 200 into/from the sub-housing 119 are provided on the front wall of the sub-housing 119, and a pair of pod openers 121 and 121 are installed at the upper and lower wafer loading/unloading ports, respectively. The pod opener 121 includes mounting tables 122 and 122 on which the pod 110 is mounted, and cap attachment/detachment mechanisms (lid attachment/detachment mechanism) 123 and 123 for attaching/detaching the cap (lid) of the pod 110. The pod opener 121 is configured to open/close a wafer entrance of the pod 110 by attaching/detaching the cap of the pod 110 mounted on the mounting table 122 by the cap attachment/detachment mechanism 123.

The sub-housing 119 constitutes a transfer chamber 124 that is fluidly isolated from an installation space of the pod transfer device 118 and the rotary pod shelf 105. A wafer transfer mechanism (substrate transfer mechanism) 125 is installed in the front region of the transfer chamber 124, and is composed of a wafer transfer device (substrate transfer device) 125a that can rotate or linearly move the wafer 200 in the horizontal direction, and a wafer transfer device elevator (substrate transfer device elevating mechanism) 125b for raising and lowering the wafer transfer device 125a. As schematically shown in FIG. 2, the wafer transfer device elevator 125b is installed between the right end portion of the pressure resistant housing 111 and the right end portion of the transfer chamber 124 front region of the sub-housing 119. By continuous operation of the wafer transfer device elevator 125b and the wafer transfer device 125a, with tweezers (substrate holding element) 125c of the wafer transfer device 125a as a mounting part of the wafer 200, the wafer 200 is loaded (charged)/unloaded (discharged) into/from a boat (substrate holder) 217.

A standby part 126 for accommodating and standing the boat 217 by is configured in the rear region of the transfer chamber 124. A process furnace 202 is provided above the standby part 126. The lower end portion of the process furnace 202 is configured to be opened/closed by a furnace opening shutter (furnace opening opening/closing mechanism).

As schematically shown in FIG. 2, a boat elevator (substrate holder elevating mechanism) 115 for raising and lowering the boat 217 is installed between the right end portion of the pressure resistant housing 111 and the right end portion of the standby part 126 of the sub-housing 119. A seal cap 219 as a lid is horizontally installed on an arm as a connector connected to an elevating stand of the boat elevator 115. The seal cap 219 is configured to vertically support the boat 217 so as to block the lower end portion of the process furnace 202. The boat 217 is provided with a plurality of holders, and is configured to hold a plurality of wafers 200 (for example, about 50 to 125 wafers) horizontally, which are arranged in a vertical direction with their centers aligned with one another.

As schematically shown in FIG. 2, a clean unit 134 composed of a supply fan and a dust-proof filter so as to supply clean air 133, which is a cleaned atmosphere or an inert gas is installed in the left end portion opposite to the wafer transfer device elevator 125b side and the boat elevator 115 side of the transfer chamber 124. Although not shown, a notch alignment device as a substrate matching device for matching the position of the wafer in the circumferential direction is installed between the wafer transfer device 125a and the clean unit 134.

The clean air 133 blown out from the clean unit 134 is distributed to the notch alignment device, the wafer transfer device 125a, and the boat 217 in the standby part 126, and then is sucked by a duct (not shown) and exhausted to the outside of the housing 111 or is circulated to the primary side (supply side) which is the suction side of the clean unit 134 and then blown out into the transfer chamber 124 by the clean unit 134 again.

(Process of Manufacturing Semiconductor Device)

An example of substrate processing related to a process of forming a film on a substrate (hereinafter, also referred to as a film-forming process), as one of processes of manufacturing a semiconductor device, using the substrate processing apparatus 10, will be described.

As shown in FIG. 2, when the pod 110 is supplied to the load port 114, the pod loading/unloading port 112 is opened by the front shutter, and the pod 110 on the load port 114 is loaded from the pod loading/unloading port 112 into the housing 111 by the pod transfer device 118.

The loaded pod 110 is automatically transferred and delivered to a designated shelf board of the rotary pod shelf 105 by the pod transfer device 118, and is temporarily stored in the shelf board. Thereafter, the pod 110 is transferred and delivered from the shelf board to one pod opener 121, and is temporarily stored in the pod opener 121. Thereafter, the pod 110 is transferred from the shelf board to one pod opener 121 and then transferred to the mounting table 122, or is directly transferred to the pod opener 121 and then transferred to the mounting table 122. At this time, the wafer loading/unloading port of the pod opener 121 is closed by the cap attachment/detachment mechanism 123, and the clean air 133 is distributed and filled in the transfer chamber 124. For example, a nitrogen gas as the clean air 133 is filled in the transfer chamber 124, so that an oxygen concentration is set to 20 ppm or less, which is much lower than the oxygen concentration of the interior (air atmosphere) of the housing 111.

The opening side end face of the pod 110 mounted on the mounting table 122 is pressed against the opening edge of the wafer loading/unloading port on the front wall of the sub-housing 119, and the cap of the pod 110 is removed by the cap attachment/detachment mechanism 123 to open the wafer entrance.

When the pod 110 is opened by the pod opener 121, the wafer 200 is picked up from the pod 110 by the tweezers 125c of the wafer transfer device 125a through the wafer entrance, is aligned with the notch alignment device, is loaded into the standby part 126 at the rear of the transfer chamber 124, and then is loaded (charged) into the boat 217. The wafer transfer device 125a that has delivered the wafer 200 to the boat 217 returns to the pod 110, and loads the next wafer 200 into the boat 217.

During the loading work of the wafer into the boat 217 by the wafer transfer mechanism 125 in one (upper or lower) pod opener 121, another pod 110 is transferred from the rotary pod shelf 105 by the pod transfer device 118 in the other (lower or upper) pod opener 121, so that the opening work of the pod 110 by the pod opener 121 is simultaneously performed.

When a predetermined number of wafers 200 are loaded into the boat 217, the lower end portion of the process furnace 202 closed by the furnace opening shutter is opened by the furnace opening shutter. Subsequently, the boat 217 holding a group of wafers 200 is loaded into the process furnace 202 by raising the seal cap 219 by the boat elevator 115.

After the boat loading, a film-forming process is performed on the wafers 200 in the process furnace 202 based on a predetermined recipe. After the film-forming process, the wafers 200 and the pod 110 are discharged to the outside of the housing in substantially the reverse procedure described above, except for the wafer alignment step in the notch alignment device.

The substrate processing apparatus 10 transmits data related to the state of the substrate processing apparatus 10, such as temperature information and pressure information, to the management system 7 during such substrate processing. Further, the substrate processing apparatus 10 transmits event information, failure information, and logging information to the management system 7.

(Hardware Configuration Example of Terminal Apparatuses 6 and 8)

Figure 3:
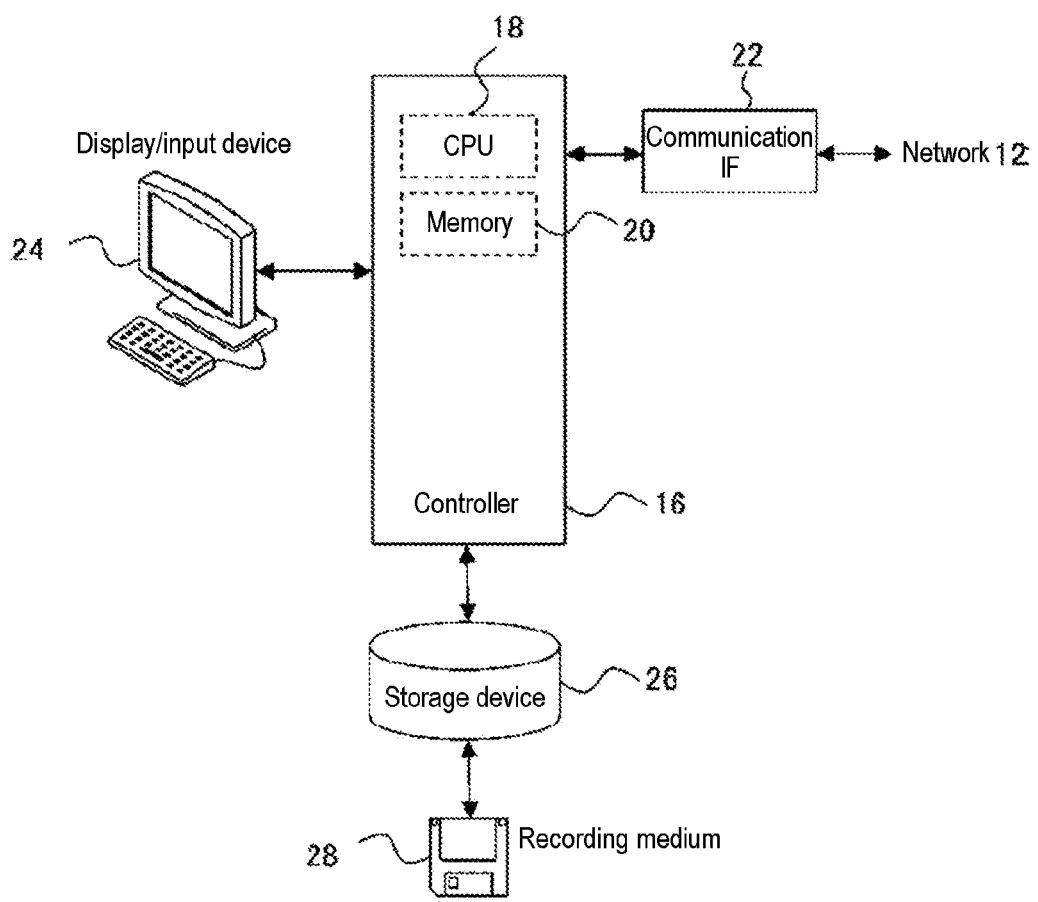
FIG. 3 is a diagram showing an example of hardware configuration of a terminal apparatus.

FIG. 3 is a diagram showing a hardware configuration example of the terminal apparatus 6. Since the terminal apparatus 8 has the same configuration as the hardware configuration of the terminal apparatus 6 shown in FIG. 3, explanation thereof will not be repeated. Needless to say, the management apparatus 7 may include the same configuration.

As shown in FIG. 3, the terminal apparatus 6 includes a controller 16 including a CPU 18 and a memory 20, a communication interface (IF) 22 that transmits/receives data to/from external hardware and the like via the network 12, a storage device 26 such as a hard disk drive, and a display/input device 24 including a display device such as a liquid crystal display, and a pointing device such as a keyboard and a mouse.

(Network Configuration Example of Management System (Management Apparatus) 7)

Figure 4:
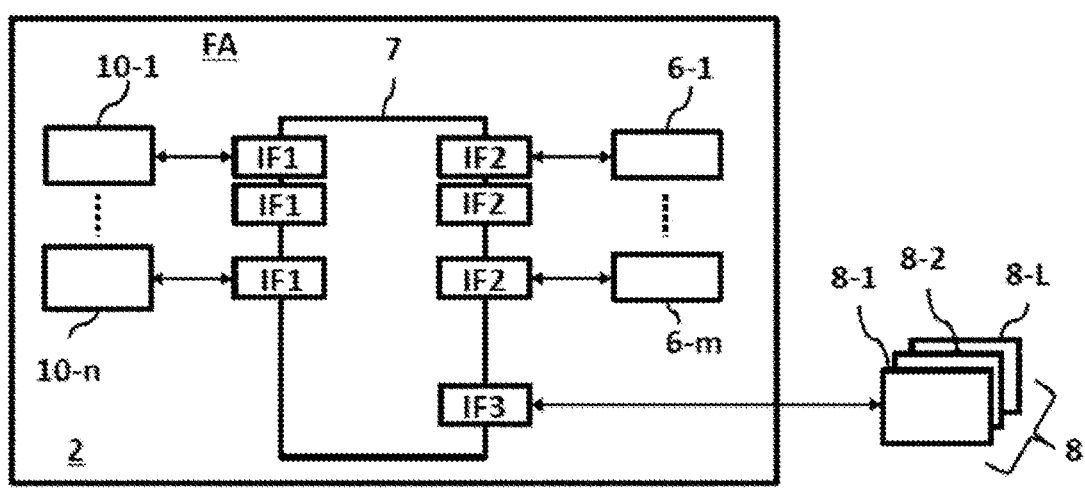
FIG. 4 is a diagram for explaining a network configuration example of one management system in one semiconductor manufacturing factory.
Figure 5:
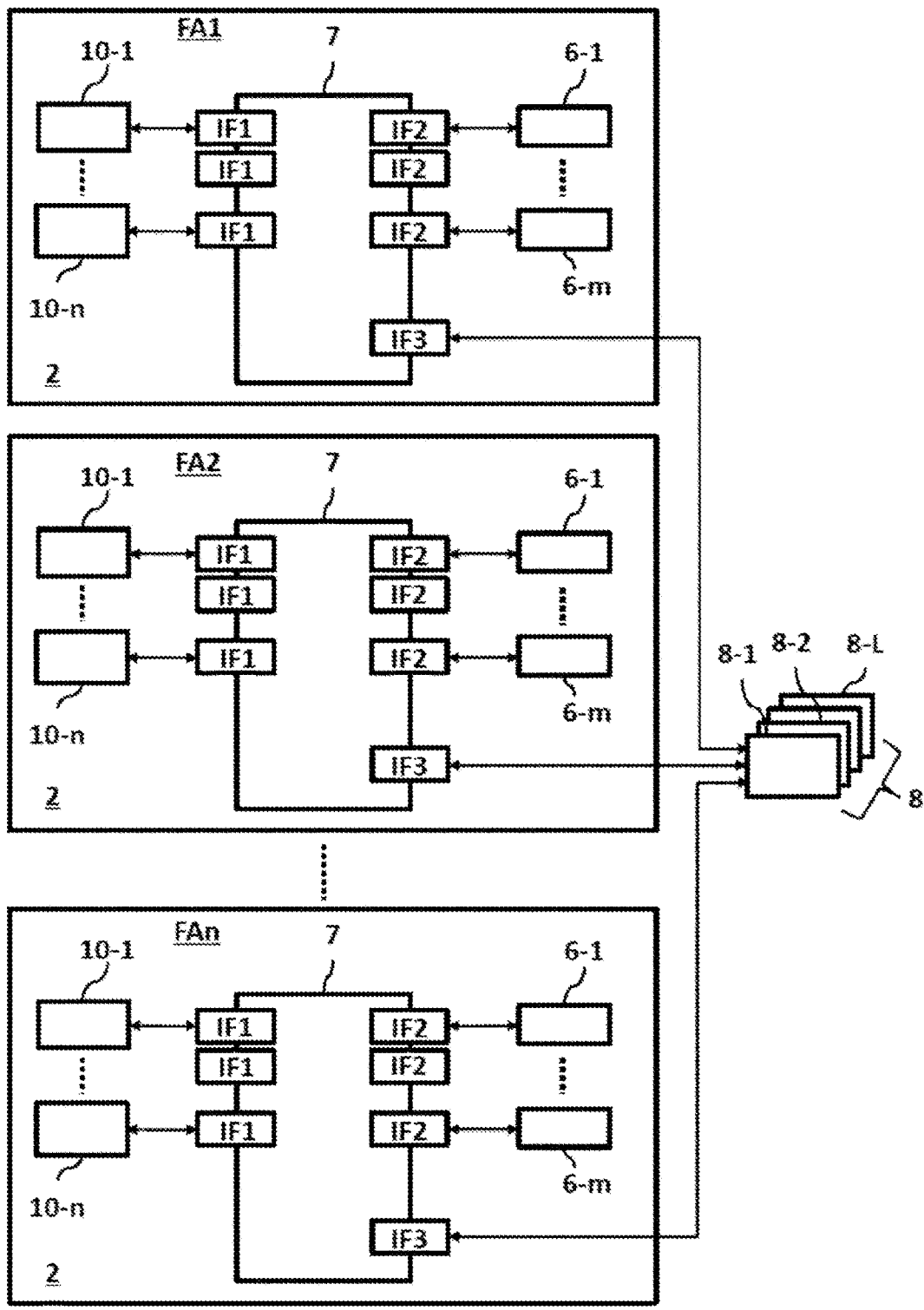
FIG. 5 is a diagram for explaining a network configuration example of a plurality of management systems in a plurality of semiconductor manufacturing factories.

FIG. 4 is a diagram for explaining a network configuration example of one management system in a semiconductor manufacturing factory. FIG. 5 is a diagram for explaining a network configuration example of a plurality of management systems in a plurality of semiconductor manufacturing factories.

As shown in FIG. 4, the substrate processing system 2 of the semiconductor manufacturing factory FA includes one management system (management apparatus) 7, and the management system 7 includes a plurality of first interfaces IF1, a plurality of second interfaces IF2, and at least one third interface IF3.

The substrate processing apparatus 10 (10-1 to 10-n) (maximum n) can be connected to the plurality of first interfaces IF1, and the first terminal apparatus 6 (6-1 to 6-m) (maximum m) can be connected to the plurality of second interfaces IF2. The first interfaces IF1 and the second interfaces IF2 adopt HSMS communication (HSMS: High Speed SECS Message Services, SECS: SEMI Equipment Communications Standard) of the SEMI (Semiconductor Equipment and Materials International) standard to provide a communication system in which connection between the management system 7 and the substrate processing apparatus 10 and between the management system 7 and the first terminal apparatus 6 is always maintained.

A plurality of second terminal apparatuses 8 (8-1 to 8-L) can be connected to a third interface IF3. The third interface IF3 adopts HTTP (Hypertext Transfer Protocol) communication to provide a communication system, and is a communication method in which the connection may be performed when it is necessary. Thereby, the plurality of second terminal apparatuses 8 can be connected to one third interface IF3. In the management system 7 including the first interfaces IF1 and the second interfaces IF2, there is a problem of the upper limit of the total number of connected terminal apparatuses. By adding the third interface IF3 to the management system 7, the problem of the upper limit of the total number of connected terminal apparatuses can be solved.

As shown in FIG. 5, each of substrate processing systems 2 of a plurality of semiconductor manufacturing factories FA1-FAn includes one management system 7 shown in FIG. 4. A plurality of second terminal apparatuses 8 are connected to the third interface IF3 provided in each management system (management apparatus) 7. That is, each of the plurality of second terminal apparatuses 8 can be connected to each management system 7 of the plurality of semiconductor manufacturing factories FA1-FAn. Therefore, each of the second terminal apparatuses 8 can also be called a crossing connection client.

In FIG. 5, each management system 7 of the semiconductor manufacturing factories FA1-FAn has a database retaining one or more pairs of the user name of a connectable second terminal apparatus 8 and the corresponding password. For example, when the second terminal apparatus 8-1 is connected to the management system 7 of the semiconductor manufacturing factory FA1, the user name and password of the second terminal apparatus 8-1 is sent from the second terminal apparatus 8-1 to the management system 7 of the semiconductor manufacturing factory FA1. The management system 7 of the semiconductor manufacturing factory FA1 performs a collation determination for match or mismatch between the received user name and password of the second terminal apparatus 8-1 and the user name and password stored in the database to perform a user/password authentication. For example, assume that the user name and password of the second terminal apparatus 8-1 are AAA and BBB, respectively. Assume that the connectable user name and password retained in the database of the management system 7 of the semiconductor manufacturing factory FA1 are AAA and BBB, respectively. Further, assume that the connectable user name and password retained in the database of the management system 7 of the semiconductor manufacturing factory FA2 are AAA and CCC, respectively. In this case, the second terminal apparatus 8-1 can be connected to the management system 7 of the semiconductor manufacturing factory FA1, but cannot be connected to the management system 7 of the semiconductor manufacturing factory FA2. Therefore, each management system 7 of the semiconductor manufacturing factory FA1-FAn can limit the number of connections and the connection of the second terminal apparatus 8. That is, the management system 7 is configured to retain the user/password authentication at the time of connection with the second terminal apparatus 8.

In FIGS. 4 and 5, for the sake of convenience of explanation, the configuration example in which one semiconductor manufacturing factory FA (FA1-FAn) includes one management system 7 has been shown, but the present disclosure is not limited thereto. One semiconductor manufacturing factory FA (FA1-FAn) may include a plurality of management systems 7. Even in this case, a plurality of second terminal apparatuses 8 can be connected to the third interface IF3 of each of the plurality of management systems 7 provided in one semiconductor manufacturing factory FA (FA1-FAn).

(Configuration Example of Circuit Block of Management System (Management Apparatus) 7)

Figure 6:
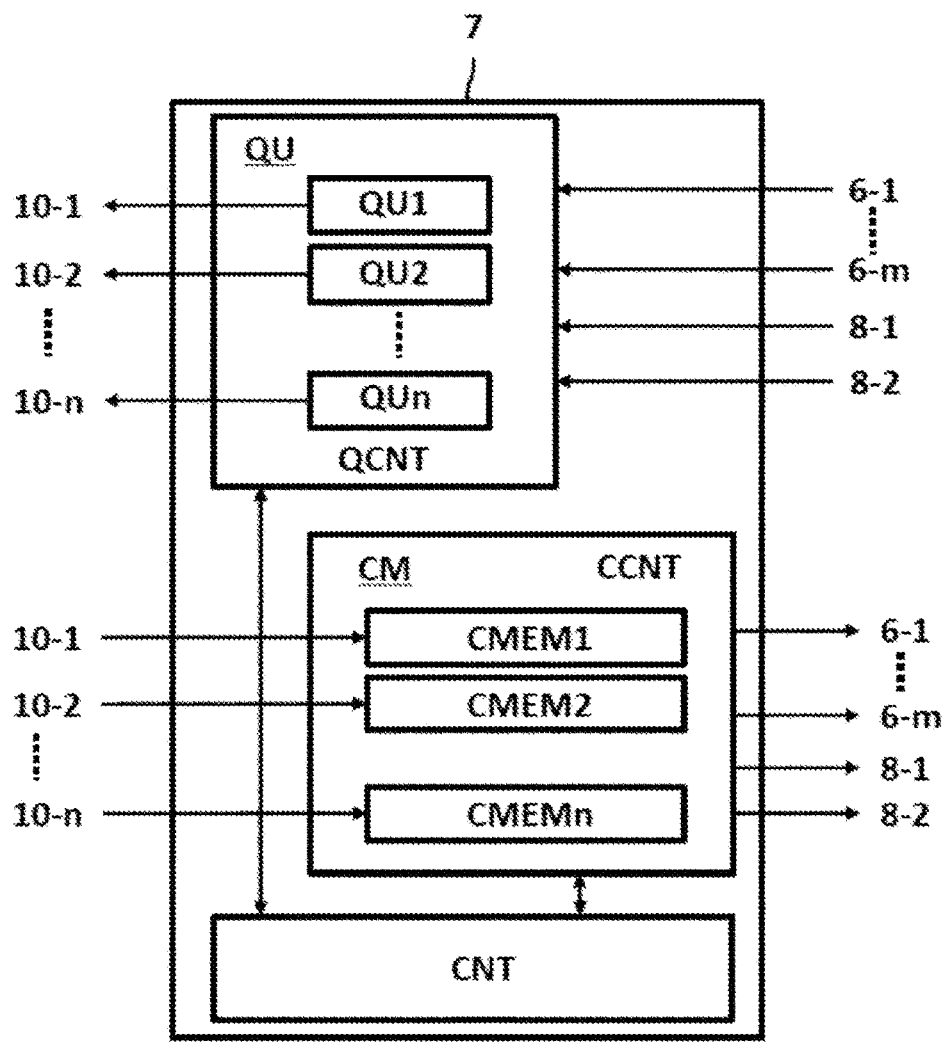
FIG. 6 is a diagram for explaining a conceptual configuration example of a circuit block of a management system.

FIG. 6 is a diagram for explaining a conceptual configuration example of a circuit block of the management system 7. As shown in FIG. 6, the management system 7 is configured to include a task queue part QU, a cache memory CM, and a controller CNT. Here, the task queue part QU is a first storage, and the cache memory CM is a second storage.

The task queue part QU has a plurality of task queues QU1 to QUn provided corresponding to the substrate processing apparatuses 10-1 to 10-$n$, and a task queue controller QCNT for controlling the task queues QU1 to QUn. The task queue QU1 is configured to be able to store a plurality of request data for requesting information acquisition from the substrate processing apparatus 10-1. Like the task queue QU1, the task queues QU2 to QUn each are also configured to be able to store a plurality of request data for the corresponding substrate processing apparatuses 10-2 to 10-$n$. Each of the terminal apparatuses 6-1 to 6-$m$ and 8-1 to 8-L generates one or more request data for the substrate processing apparatuses 10-1 to 10-$n$ based on a user's request. The plurality of request data generated from the terminal apparatuses 6-1 to 6-$m$ and 8-1 to 8-L are supplied to the task queue part QU, and the task queue controller QCNT performs a control to classify the plurality of received request data for each of the substrate processing apparatuses 10-2 to 10-$n$ and store (push) them in the corresponding task queues QU1 to QUn. Then, the task queue controller QCNT performs a controls to take out (pop) the request data stored in the task queues QU1 to QUn and transmit them to each of the substrate processing apparatuses 10-1 to 10-$n$. The request data can also be paraphrased into tasks, orders, commands, instructions, and the like.

The cache memory CM has a plurality of memories CMEM1 to CMEMn provided corresponding to each of the substrate processing apparatuses 10-1 to 10-$n$, and a memory controller CCNT for controlling the plurality of memories CMEM1 to CMEMn. The memory controller CCNT performs a control to transmit response data, which are generated by each of the substrate processing apparatuses 10-1 to 10-$n$ in response to the request data from the task queues QU1 to QUn, to the requesting terminal apparatuses 6-1 to 6-$m$ and 8-1 to 8-L). Further, the memory controller CCNT performs a control to store the response data generated by each of the substrate processing apparatuses 10-1 to 10-$n$ in the corresponding memories CMEM1 to CMEMn.

For example, when the controller CNT is notified from the task queue controller QCNT that the task queue part QU receives the request data for the substrate processing apparatus 10-1 from any of the terminal apparatuses 6-1 to 6-$m$ and 8-1 to 8-L, the controller CNT checks the memory controller CCNT whether or not the response data corresponding to (matching) the request data is stored in the memory CMEM1 corresponding to the substrate processing apparatus 10-1. Then, when the controller CNT is informed from the memory controller CCNT that the response data corresponding to the request data is stored in the memory CMEM1, the controller CNT controls the task queue controller QCNT so as not to store the request data in the task queue QU1, and controls the memory controller CCNT so as to transmit the response data stored in the memory CMEM1 to the requesting terminal apparatus. On the other hand, when the controller CNT is informed from the memory controller CCNT that the response data corresponding to the request data is not stored in the memory CMEM1, the controller CNT controls the task queue controller QCNT so as to store the request data in the task queue QU1 corresponding to the substrate processing apparatus 10-1. In the above, the request data for the substrate processing apparatus 10-1 has been described as a representative example, but the same operation as described above is performed for the request data for each of the substrate processing apparatuses 10-2 to 10-$n$.

The management system (management apparatus) 7 includes the task queue part (first storage) QU, the cache memory (second storage) CM, and the controller CNT. The controller CNT of the management system (management apparatus) 7 receives the request data instructing information acquisition from the terminal apparatuses 6 and 8, and based on the received request data, searches one of task queue information of the request data stored in the task queue part (first storage) QU and cache information of the response data stored in the cache memory (second storage) CM. Then, the controller CNT of the management system (management apparatus) 7 can use at least one selected from the group of the task queue part (first storage) QU and the cache memory (second storage) CM (at least one selected from the group of the request data and the response data) to acquire the information of the substrate processing apparatus 10 corresponding to the contents of the received request data.

Further, the management system 7 monitors the events of the substrate processing apparatuses 10-1 to 10-$n$, and when the information of the substrate processing apparatus stored in the cache memory CM by the event becomes outdated, the controller CNT performs a control so as to discard the corresponding apparatus information from the cache memory CM.

As a result, even if a large number of request data are simultaneously received from the terminal apparatuses 6-1 to 6-*m* and 8-1 to 8-L, which are a large number of connection clients, it is possible to provide a management system 7 capable of providing a high-speed response to each client while minimizing the loads of the substrate processing apparatuses 10-1 to 10-*n*.

Here, the substrate processing system 2 can be summarized as the following configuration. The substrate processing system 2 includes the first client 6 configured to be connectable to the substrate processing apparatus 10, the second client 8 arranged at a position separated from the first client 6, and the management apparatus 7 configured to be able to receive the request data from the first client 6 and/or the second client 8, search one of the first storage QU and the second storage CM based on the received request data, and acquire the information of the substrate processing apparatus 10 according to contents of the request data by using at least one selected from the group of the first storage QU and the second storage CM.

Further, a data processing method of the management apparatus 7 can be summarized as the following configuration. The data processing method of the management apparatus 7 includes a step of receiving the request data from the terminal apparatuses 6 and 8, a step of searching one of the first storage QU and the second storage CM based on the received request data, and a step of acquiring the information of the substrate processing apparatus 10 corresponding to the contents of the request data by using at least one selected from the group of the first storage QU and the second storage CM.

A program executed by the controller CNT of the management apparatus 7 can be summarized as the following configuration. The program executed by the controller CNT of the management apparatus 7 causes the management apparatus to perform a process including a step of receiving the request data from the terminal apparatuses 6 and 8, a step of searching one of the first storage QU and the second storage CM based on the received request data, and a step of acquiring the information of the substrate processing apparatus 10 corresponding to the contents of the request data by using at least one selected from the group of the first storage QU and the second storage CM.

A method of manufacturing the semiconductor device can be summarized as the following configuration. The method includes a substrate processing process of processing a substrate by executing a predetermined recipe. The substrate processing process includes a step of receiving the request data from the terminal apparatuses 6 and 8, a step of searching one of the first storage QU and the second storage CM based on the received request data, and a step of acquiring the information of the substrate processing apparatus 10 corresponding to the contents of the request data by using at least one selected from the group of the first storage QU and the second storage CM.

(Priority of Request Data)

FIG. 7 is a diagram for explaining a table of priority of the request data for the substrate processing apparatus. As shown in the priority table of FIG. 7, four request data are shown in this example, as the request data for the substrate processing apparatus. Priority is set for each of request data types (tasks) in the four request data. The four request data include task TK5 having the highest priority level of "5," task TK4 having the priority level of "4," task TK2 having the priority level of "2," and task TK0 having the lowest priority level of "0."

The priority level shown here is an initial value and can be changed. The task TK5 is request data for requesting acquisition of a file list for displaying the file list of the apparatus. The task TK4 is request data for requesting file acquisition from the apparatus according to a user instruction. The task TK2 is request data for requesting file transmission to the apparatus. Task TK0 is request data for requesting device log file acquisition. Therefore, the request data are selected from at least one selected from the group of the file list acquisition request (TK5) for displaying the file list of the apparatus, the file acquisition request (TK4) from the apparatus according to the user instruction, the log file acquisition request (TK0), and the transmission request (TK2) of the file to the apparatus.

Here, for example, it is better to process the file list acquisition request (TK5) for displaying the file list of the apparatus 10 on a GUI and the file acquisition (TK4) from the apparatus according to the user instruction, as higher priority. On the other hand, it is better to process the log file acquisition (TK0) and the transmission (TK2) of the file to the apparatus, as lower priority. The log file includes data such as a screenshot created by the apparatus, a communication log that saves communication of the apparatus, an event log that saves an operating status and events of the apparatus, and an error log that saves error information that occurred. The log file includes at least one or more of these data. Further, at least one or more of these data can be selected as the data to be used as the log file. The request data for the substrate processing apparatus can be additionally defined as needed, and is not limited to the four tasks (TK5, TK4, TK2, and TK0) shown in FIG. 7. The number of tasks may be 5, or 5 or more, or 3, or 2.

(Acceptance Flow of Request Data from Terminal apparatus)

Figure 8:
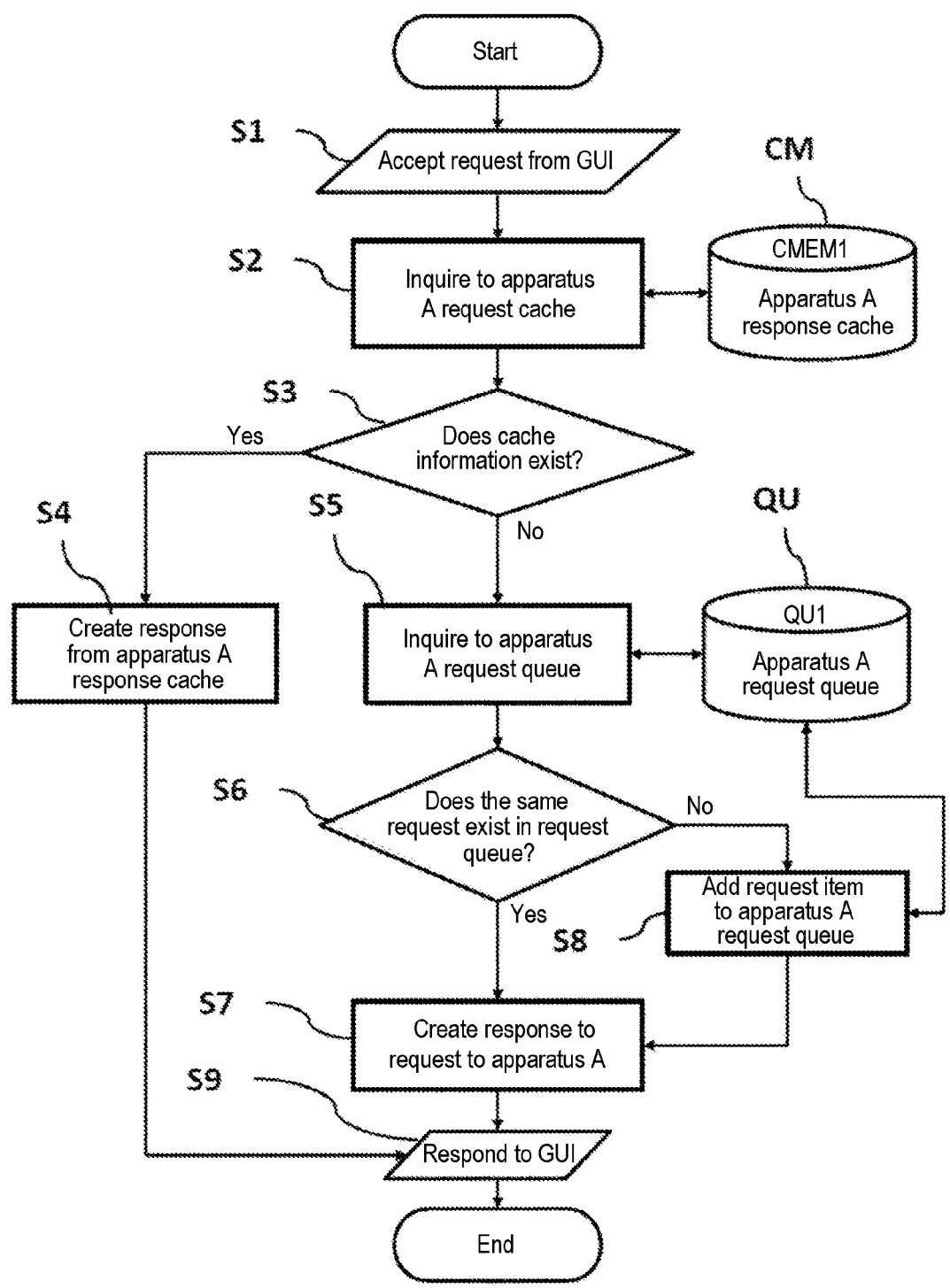
FIG. 8 is a diagram for explaining a flow chart of request data from a terminal apparatus being accepted by the management system (acceptance flow).

FIG. 8 is a diagram for explaining a flow chart of request data from a terminal apparatus being accepted by the management system (acceptance flow). As a typical example, an acceptance flow when the management system 7 accepts request data for the substrate processing apparatus 10-1 from the terminal apparatuses 6 and 8 is shown in FIG. 8. Here, the task queue QU1 of the task queue part QU is a task queue provided corresponding to the substrate processing apparatus 10-1, and the memory CMEM1 of the cache memory CM is a memory provided corresponding to the substrate processing apparatus 10-1. In FIG. 8, the substrate processing apparatus 10-1 is described as an apparatus A, the memory CMEM1 is described as an apparatus A response cache, and the task queue QU1 is described as an apparatus A request queue. Hereinafter, each step will be described.

(Step S1)

When the terminal apparatuses 6 and 8 are operated to input and transmit the request data for the substrate processing apparatus 10-1 to a GUI of the display/input device 24 of the terminal apparatuses 6 and 8, the management system 7 accepts the request data of the terminal apparatuses 6 and 8. Then, the acceptance flow proceeds to step S2.

(Step S2)

The controller CNT of the management system 7 makes an inquiry (search) to the cache memory CM in order to check whether or not response data to the request data accepted in step S1 is stored in the memory CMEM1. Then, the acceptance flow proceeds to step S3.

(Step S3)

The controller CNT checks whether or not the response data to the request data exists as cache information in the memory CMEM1. When the response data exists as the cache information ("YES"), the acceptance flow proceeds to step S4. When the response data does not exist as the cache information ("NO"), the acceptance flow proceeds to step S5.

(Step S4)

The controller CNT of the management system 7 creates response data for the request data from the cache information stored in the memory CMEM1. Then, the acceptance flow proceeds to step S9.

That is, when the request data is accepted, the controller CNT of the management system 7 searches the memory CMEM1 of the cache memory (second storage) CM, and if the cache information according to the received request data is stored in the memory CMEM1, the controller CNT can respond to the terminal apparatuses 6 and 8.

(Step S5)

The controller CNT of the management system 7 makes an inquiry (search) to the task queue part QU in order to check whether or not the same request data as the request data is stored in the task queue QU1 of the task queue part QU. Then, the acceptance flow proceeds to step S6.

(Step S6)

The controller CNT of the management system 7 checks whether or not the same request data as the request data exists in the task queue QU1. When the same request data exists ("YES"), the controller CNT performs a control to combine request data added later to the task queue QU1 (corresponding to the received request data) into the previously stored request data. After that, the acceptance flow proceeds to step S7. When the same request data does not exist ("NO"), the acceptance flow proceeds to step S8.

That is, if cache information (response data) according to the received request data is not stored in the memory CMEM1 of the cache memory (second storage) CM (that is, there is no cache information in the memory CMEM1), the controller CNT of the management system 7 searches the task queue QU1 of the task queue part (first storage) QU to check whether or not the same request data as the received request data exists in the task queue QU1 of the task queue part (first storage) QU (that is, to check whether the same request data is present or absent). Then, when the same request data exists in the task queue QU1, the controller CNT of the management system 7 combines the same request data.

(Step S7)

The controller CNT of the management system 7 creates a response for the terminal apparatuses 6 and 8 to request the substrate processing apparatus 10-1 to send the request data. Then, the acceptance flow proceeds to step S9.

(Step S8)

The controller CNT of the management system 7 adds the request data as a request item to the task queue QU1. Then, the acceptance flow proceeds to step S7.

That is, if there is no same request data as the received request data in the task queue QU1 of the task queue part (first storage) QU, the controller CNT of the management system 7 adds the request data received as the request item to the task queue QU1 of the task queue part (first storage) QU.

(Step S9)

The controller CNT of the management system 7 makes a response by transmitting the created response data (S4) or response (S7) to the GUI of the display/input device 24 of the terminal apparatuses 6 and 8.

That is, if the cache information according to the received request data is not stored in the memory CMEM1 of the cache memory (second storage) CM (that is, if there is no cache information in the memory CMEM1), the controller CNT of the management system 7 can respond to the terminal apparatuses 6 and 8, which results in the controller to request the processing apparatus 10-1 for the received request data.

(Request Processing Flow of Request Data from Management System to Substrate Processing Apparatus)

Figure 9:
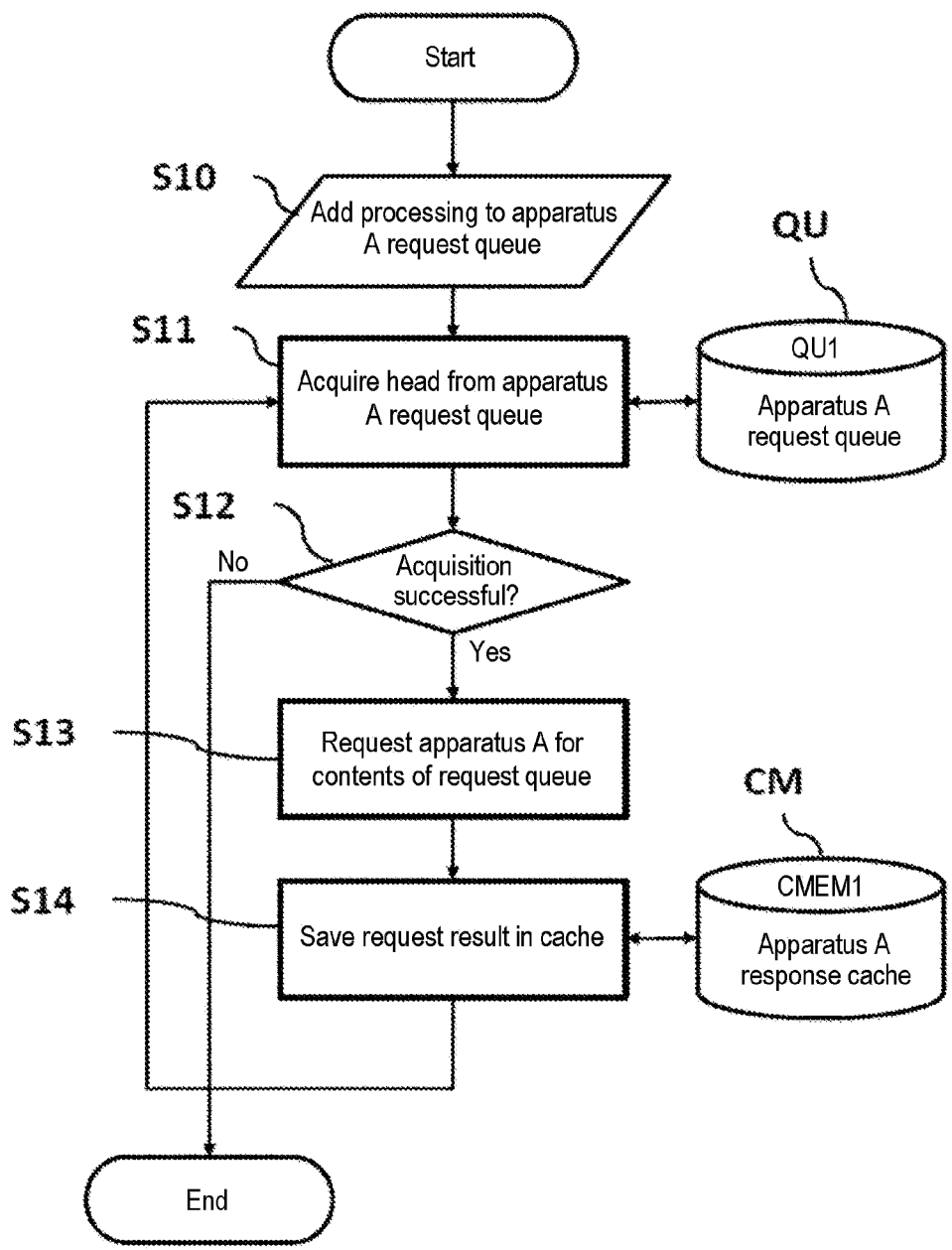
FIG. 9 is a diagram for explaining a flow chart of request data from the management system to a substrate processing apparatus (request processing flow).

FIG. 9 is a diagram for explaining a flow chart of request data from the management system to the substrate processing apparatus (request processing flow). As a typical example, a request processing flow of the request data from the management system 7 to the substrate processing apparatus 10-1 is shown in FIG. 9. In FIG. 9, for example, description will be given with an apparatus A as the substrate processing apparatus 10-1, the task queue of the task queue part QU as the task queue QU1 provided corresponding to the substrate processing apparatus 10-1, and the memory of the cache memory CM as the memory CMEM1 provided corresponding to the substrate processing apparatus 10-1. In FIG. 9, the substrate processing apparatus 10-1 is described as the apparatus A, the memory CMEM1 is described as an apparatus A response cache, and the task queue QU1 is described as an apparatus A request queue. Hereinafter, each step will be described.

(Step S10)

First, processing of request data is added to the task queue QU1. After that, the request processing flow proceeds to step S11.

(Step S11)

The controller CNT of the management system 7 controls to acquire a head request data from the task queue QU1, and the request processing flow proceeds to step S12.

(Step S12)

The controller CNT of the management system 7 checks whether or not the acquisition of the head request data from the task queue QU1 is successful. When the acquisition of the head request data is successful ("YES"), the request processing flow proceeds to step S13. When the acquisition of the head request data is not successful (that is, when it fails: "NO"), the request processing flow ends.

(Step S13)

The controller CNT of the management system 7 requests the substrate processing apparatus 10-1 for contents of the head request data. After that, the request processing flow proceeds to step S14.

(Step S14)

The controller CNT of the management system 7 receives response data to the request data from the substrate processing apparatus 10-1, and saves the received response data in the memory CMEM1. Then, the request processing flow proceeds to step S11 where steps S12 to S14 are executed one or more times until the request data stored in the task queue QU1 are exhausted.

(Reception Flow of Apparatus Event)

Figure 10:
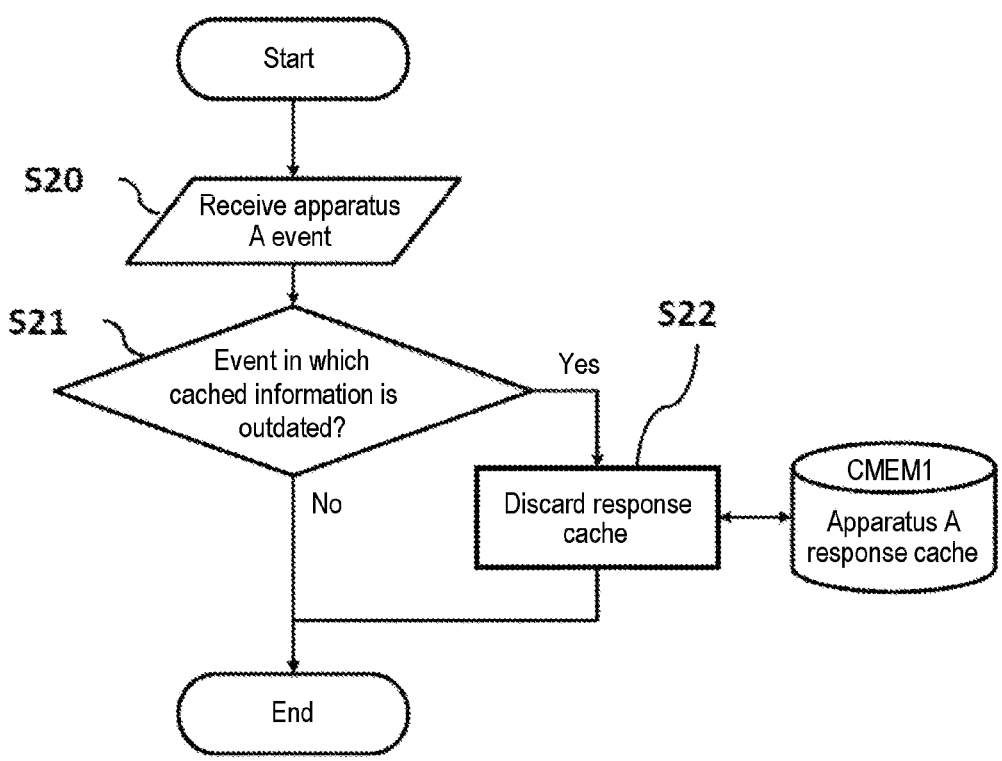
FIG. 10 is a diagram for explaining a flow chart of when an event transmitted from a substrate processing apparatus is received by the management system (reception flow).

FIG. 10 is a diagram for explaining a flow chart of when an event transmitted from a substrate processing apparatus is received by the management system 7 (reception flow). As a typical example, a reception flow when an event transmitted from the substrate processing apparatus 10-1 is received by the management system 7 is shown in FIG. 10. In FIG. 10, the substrate processing apparatus 10-1 is described as an apparatus A, and the memory CMEM1 is described as an apparatus A response cache. Hereinafter, each step will be described.

(Step S20)

The management system 7 receives an event transmitted from the substrate processing apparatus 10-1.

(Step S21)

The controller CNT of the management system 7 determines whether or not the received event is an event in which any of a plurality of pieces of cache information stored in the memory CMEM1 becomes outdated and cannot be used. When the received event is an event in which the cache information becomes outdated and cannot be used ("YES"), the reception flow proceeds to step S22. When the received event is not an event in which the cache information becomes outdated and cannot be used ("NO"), the reception flow ends.

(Step S22)

The controller CNT of the management system 7 discards the cache information related to the received event, stored in the memory CMEM1. Then, the reception flow ends.

That is, when acquiring the event information from the substrate processing apparatus 10-1, the controller CNT of the management system 7 checks whether or not the cache information saved in the memory CMEM1 of the cache memory (second storage) CM is an outdated event information, and discards the cache information when the cache information is the outdated event information.

(Operation Example of Task Queue)

Next, an operation example of the task queue part QU will be described with reference to the drawings. In the following description, as a typical example, the operation of the task queue QU1 in the task queue part QU will be described. Since the description of each operation of the other task queues QU2 to QUn is the same as the operation of the task queue QU1, explanation thereof will not be repeated.

(Overview of Basic Operation of Task Queue)

Figure 11:
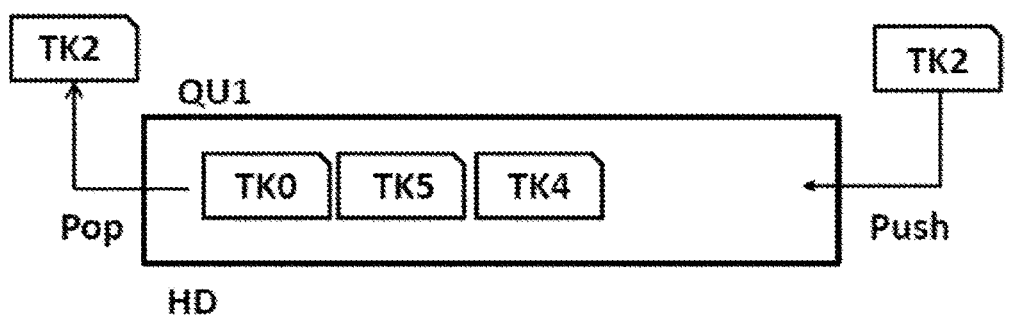
FIG. 11 is a diagram for explaining an overview of the operation of a task queue.

FIG. 11 is a diagram for explaining an overview of the operation of a task queue. The task queue QU1 is configured to be able to store a plurality of request data TK0, TK5, and TK4 for the substrate processing apparatus 10-1. FIG. 11 shows a state where request data TK2 is taken out (popped) from the head HD of the task queue QU1 and sent to the substrate processing apparatus 10-1 and a state where new request data TK2 generated from the terminal apparatuses 6-1 to 6-m, 8-1, 8-2 and the like is stored (pushed) in the task queue QU1.

(Task Queue Operation 1: Combination Process of the Same Request Data)

Figure 12:
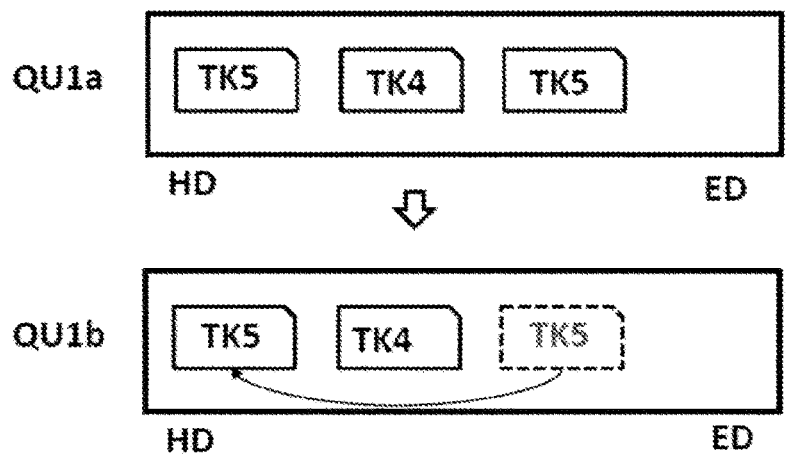
FIG. 12 is a diagram for explaining a combination process of the same request data in the task queue.

FIG. 12 is a diagram for explaining a combination process of the same request data in a task queue. As described in step S6 of FIG. 8, this process is a process when the same request data are stored in the task queue QU1. As shown in FIG. 12, tasks TK5, TK4, and TK5 are sequentially stored in a task queue QU1*a* from the head HD side to the rear ED side. Here, the two tasks TK5 are the same request data, and requesting the substrate processing apparatus 10-1 for the same requests TK5 twice is wasteful. Therefore, as shown in a task queue QU1*b*, a process of combining the task TK5 on the rear ED side stored in the task queue QU1 later into the task TK5 on the head HD side is executed. As a result, the load on the substrate processing apparatus 10-1 can be reduced.

(Task Queue Operation 2: Deletion of Request Data by Apparatus Event)

Figure 13:
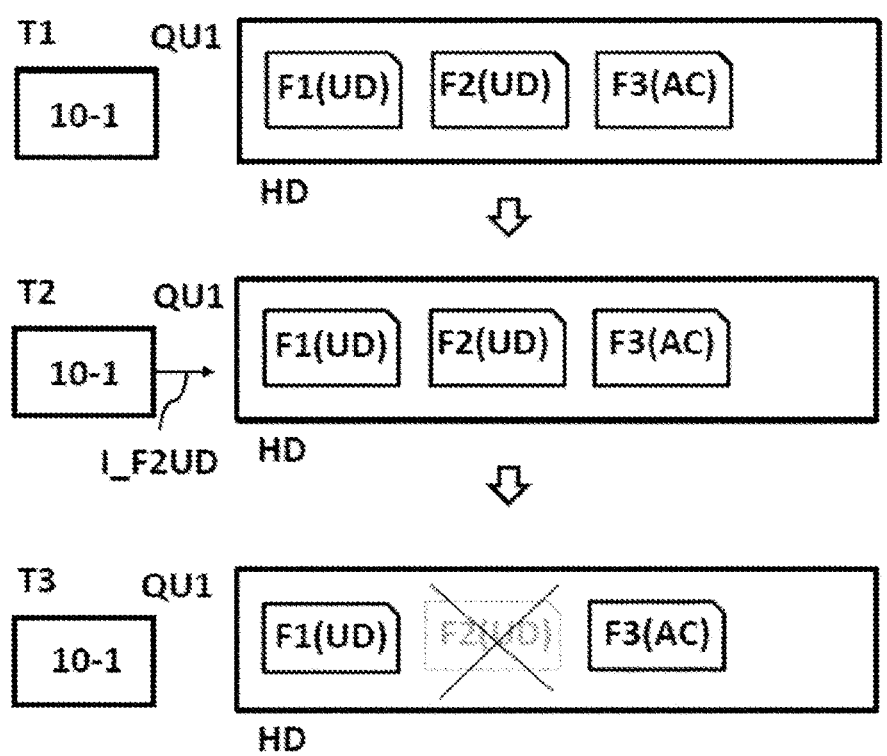
FIG. 13 is a diagram for explaining deletion of request data by an event from a substrate processing apparatus.

FIG. 13 is a diagram for explaining deletion of request data by an event from a substrate processing apparatus. When an event (edition, deletion, etc.) indicating that the contents of a predetermined file in the substrate processing apparatus 10-1 have been changed is notified from the substrate processing apparatus 10-1, it may be possible to cancel all request data (tasks) to the corresponding predetermined file stored in the task queue QU1. FIG. 13 shows a state of the task queue QU1 at each of time T1, time T2 (after time T1: T1<T2), and time T3 (after time T2: T2<T3).

At time T1, assume that, for example, request data F1(UD) requesting update of file 1 of the substrate processing apparatus 10-1, request data F2(UD) requesting update of file 2 of the substrate processing apparatus 10-1, and request data F3(AC) requesting acquisition of file 3 of the substrate processing apparatus 10-1 are stored in the task queue QU1. The request data F1(UD) and F2(UD) correspond to TK2 in FIG. 7, and the request data F3(AC) corresponds to TK4 or TK0 in FIG. 7.

At time T2, assume that an event I_F2UD indicating that file 2 has been updated is notified from the substrate processing apparatus 10-1 to the management system 7. In this case, when the request data F2(UD) in the task queue QU1 is requested and executed by the substrate processing apparatus 10-1, the updated file 2 is undesirably updated. Therefore, it may be possible not to use the request data F2(UD), and the controller CNT of the management system 7 makes a determination to delete the request data F2(UD).

As a result, at time T3, the controller CNT of the management system 7 performs a control to delete the request data F2(UD) from the task queue QU1. That is, when acquiring event information from the substrate processing apparatus 10-1, the controller CNT of the management system 7 checks whether or not the request data saved in the task queue QU1 of the task queue part (first storage) QU is outdated event information, and deletes the request data saved in the task queue QU1 when the request data is the outdated event information.

(Task Queue Operation 3: Re-Arrangement of Request Data in Consideration of Priority)

Figure 14:
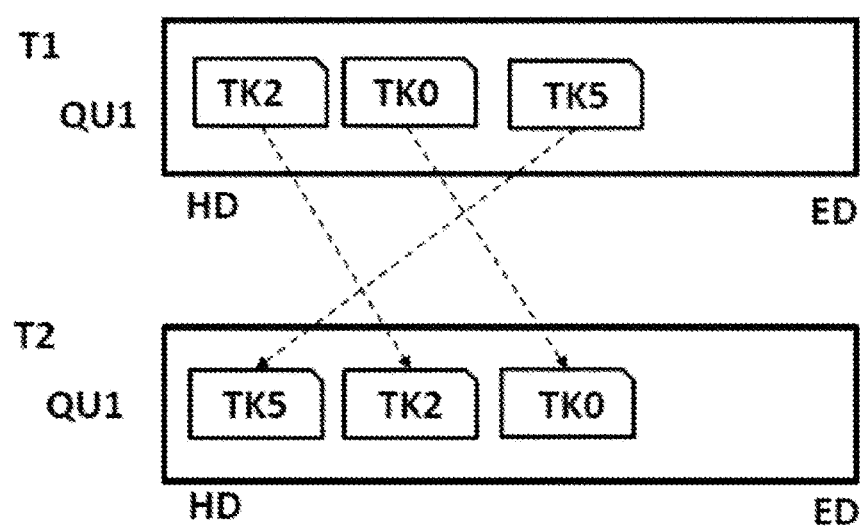
FIG. 14 is a diagram for explaining re-arrangement in consideration of the priority of request data in the task queue.

FIG. 14 is a diagram for explaining re-arrangement in consideration of a priority of request data in a task queue.

At time T1 in FIG. 14, a state of the task queue QU1 in which the request data TK5 having the highest priority level of "5" is added and stored in the task queue QU1 storing the request data TK2 having the priority level of "2" and the request data TK0 having the priority level of "0" is shown. Here, in order to preferentially process the request data TK5 over the request data TK2 and the request data TK0, or in order to prioritize the request data (here, TK5) that affects a response, the controller CNT of the management system 7 performs a control to re-arrange a plurality of request data in the task queue QU1 in consideration of the priority.

As shown by time T2, the controller CNT of the management system 7 performs a control to move the request data TK5 to the head HD side of the task queue QU1 and move the request data TK2 and the request data TK0 to the rear ED side by one. That is, the controller CNT of the management system 7 changes the order of requests according to the priority of the request data so as to be able to request the substrate processing apparatus 10-1 to transmit a plurality of request data in the task queue QU1 of the task queue part (first storage) QU according to their priorities.

As a result, it is possible to preferentially process the request data having a high priority or the request data that affects a response, thereby providing a high-speed response to each of the clients 6 and 8.

(Task Queue Operation 4: Priority Changing Process)

Figure 15:
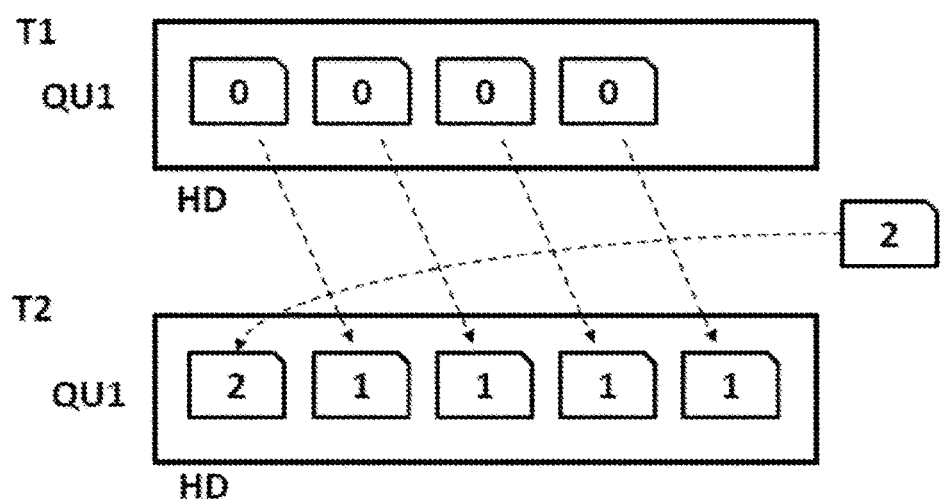
FIG. 15 is a diagram for explaining a priority changing process.

As described with reference to FIG. 14, when the request data is added to the task queue, if the request data is re-arranged in consideration of the priority, the execution of the request data (for example, TK0) having the lowest priority level of "0" may be delayed so that it may not be possible to appropriately respond to each of the clients 6 and 8. Therefore, when the request data is added to the task queue, a process of raising the priority level by "1" is executed for the request data whose processing order is lowered due to the re-arrangement. This makes it possible to appropriately respond to each of the clients 6 and 8. FIG. 15 is a diagram for explaining a priority changing process. Numerical values 0, 1, and 2 shown in FIG. 15 indicate the priority level of request data.

As shown at time T1 in FIG. 15, it is assumed that a plurality of request data having the lowest priority level of "0" are stored in the task queue QU1. Here, request data having the priority level of "2" is added to the task queue QU1. In this case, as described with reference to FIG. 14, the plurality of request data in the task queue QU1 are re-arranged according to their priorities.

As shown at time T2 in FIG. 15, in the task queue QU1, the request data having the priority level of "2" is added to the head of the task queue QU1. Along with this, the plurality of request data having the priority level of "0" at time T1 move, but the priority level of the request data whose processing order is lowered due to the re-arrangement is raised from "0" to "1," that is, the priority level thereof is changed to "1." In this way, the controller CNT of the management system 7 is configured to raise, by one, the priority of the request data whose order of request to the substrate processing apparatus 10-1 is postponed, among the request data in the task queue QU1 of the task queue part (first storage) QU.

According to the embodiment, one or more effects set forth below can be achieved.

1) It is conceivable that the first client (a client that maintains connection: the terminal apparatus 6) and the second client (a client that does not maintain connection: the terminal apparatus 8) coexist and a request data (task) that requests a process from a plurality of clients 6 and 8 at the same timing occurs. In the embodiment, the management system 7 includes the task queue part QU and the cache memory. Since a request to each substrate processing apparatus 10 is queued (stored) in the task queue part QU and response data for request data (task) is cached (stored) in the cache memory, there is no situation in which a specific client occupies a substrate processing apparatus so that other clients cannot acquire information of the substrate processing apparatus.

2) When the clients 6 and 8 simultaneously make a request other than a reference to the same file, since the subsequent request is rejected, inconsistency due to a simultaneous operation does not occur.

3) Even if a large number of requests are accepted from a large number of simultaneous connection clients 6 and 8 at the same time, it is possible to minimize the load on an apparatus and provide a mechanism for providing a client with a high-speed response.

4) In a plant with a plurality of factories or a large number of semiconductor manufacturing apparatuses, it is possible to improve the efficiency of a management work of the semiconductor manufacturing apparatuses. In addition, if a user's network permits, it is possible to use the crossing connection client 8 to connect to all management systems 7 scattered in domestic and overseas so as to maintain each substrate processing apparatus in each factory.

In the present embodiment, the management apparatus 7 does not need to be installed on the same floor or clean room as the substrate processing apparatus 10, and may be installed, for example, on another floor by connecting to a LAN. For example, the terminal apparatus 6 of the management apparatus 7 may be placed in an office away from the clean room to remotely search data in a database of the management apparatus 7.

The present disclosure can be applied not only to a semiconductor manufacturing apparatus but also to an apparatus such as a LCD apparatus for processing a glass substrate, as the substrate processing apparatus 10.

Further, the film-forming process includes, for example, a CVD, a PVD, a process of forming an oxide film or a nitride film, a process of forming a film containing metal, and the like. Further, the film-forming process may include processes such as an annealing process, an oxidation process, a nitridation process, and a diffusion process.

The substrate processing apparatus 10 may be other substrate processing apparatus such as an exposure apparatus, a coating apparatus, a drying apparatus, or a heater.

The technique disclosed in the present disclosure has been specifically described above based on the embodiment, but it goes without saying that the present disclosure is not limited to the above embodiment and can be changed in various ways.

<Aspects of Present Disclosure>

Hereinafter, some aspects of the present disclosure will be additionally described as supplementary notes.

(Supplementary Note 1)

A management apparatus including: a first storage configured to store request data from a terminal apparatus; a second storage configured to store information from a processing apparatus; and a controller configured to be capable of searching one of the first storage and the second storage based on the received request data and using at least one selected from the group of the first storage and the second storage to acquire the information of the processing apparatus corresponding to contents of the request data.

(Supplementary Note 2)

The management apparatus of Supplementary Note 1, wherein when the request data is accepted, the controller is configured to be capable of searching the second storage and responding to the terminal apparatus if there is cache information according to the request data.

(Supplementary Note 3)

The management apparatus of Supplementary Note 2, wherein when the request data is accepted, the controller is configured to be capable of searching the second storage and responding to the terminal apparatus, which results in the controller to request the processing apparatus for the request data if there is no cache information according to the request data.

(Supplementary Note 4)

The management apparatus of Supplementary Note 3, wherein if there is no cache information according to the request data, the controller searches the first storage to check for presence or absence of the same request data in the first storage.

(Supplementary Note 5)

The management apparatus of Supplementary Note 4, wherein if the same request data is not present in the first storage, the controller is configured to add a request item in the first storage and acquire the head request data in the first storage.

(Supplementary Note 6)

The management apparatus of Supplementary Note 5, wherein the controller is configured to extract the head request data from a plurality of request data stored in the first storage and transmit the extracted head request data to the processing apparatus, and acquire a result corresponding to the request data to save the acquired result in the second storage.

(Supplementary Note 7)

The management apparatus of Supplementary Note 4, wherein if the same request data is stored in the first storage, the controller is configured to combine the request data into the same request data.

(Supplementary Note 8)

The management apparatus of Supplementary Note 2, wherein when acquiring event information from the processing apparatus, the controller is configured to check whether or not the cache information stored in the second storage is an outdated event information and discard the cache information if the cache information is the outdated event information.

(Supplementary Note 9)

The management apparatus of Supplementary Note 1, wherein when acquiring event information from the processing apparatus, the controller is configured to check whether or not the request data stored in the first storage is outdated event information and delete the request data when the request data is the outdated event information.

(Supplementary Note 10)

The management apparatus of Supplementary Note 1, further including: a table in which a priority is set for each type of the request data, wherein the controller is configured to change an order in which the controller requests the processing apparatus for the request data in the first storage according to the priority.

(Supplementary Note 11)

The management apparatus of Supplementary Note 10, wherein the controller is configured to raise, by one, the priority of the request data whose order of request to the processing apparatus is postponed, among the request data in the first storage.

(Supplementary Note 12)

The management apparatus of Supplementary Note 10, wherein the request data is selected from at least one selected from the group of a file list acquisition request for displaying a file list of the apparatus, a file acquisition request from the apparatus according to a user instruction, a log file acquisition request, and a file transmission request to the apparatus.

(Supplementary Note 13)

The management apparatus of Supplementary Note 12, wherein the log file is selected from least one selected from the group of a screenshot created by the apparatus, a communication log that saves communication of the apparatus, an event log that saves an operating status and events of the apparatus, and an error log that saves error information that occurred.

(Supplementary Note 14)

The management apparatus of Supplementary Note 1, wherein the controller is configured to retain a user/password authentication at a time of connection with the terminal apparatus.

(Supplementary Note 15)

The management apparatus of Supplementary Note 1, wherein the controller is configured to include a first storage provided in a task queue that stores a plurality of request data for each connected processing apparatus.

(Supplementary Note 16)

A processing system including: a first storage configured to store request data from a terminal apparatus; a second storage configured to store information from a processing apparatus; and a management apparatus configured to be capable of searching one of the first storage and the second storage based on the received request data and acquiring the information of the processing apparatus corresponding to the contents of the request data by using at least one selected from the group of the first storage and the second storage.

(Supplementary Note 17)

A method of processing data, including: receiving request data from a terminal apparatus; searching one of a first storage and a second storage based on the received request data; and acquiring information of a processing apparatus corresponding to contents of the request data by using at least one selected from the group of the first storage and the second storage.

(Supplementary Note 18)

A program that causes a management apparatus to a process including: receiving request data from a terminal apparatus; searching one of a first storage and a second storage based on the received request data; and acquiring information of a processing apparatus corresponding to contents of the request data by using at least one selected from the group of the first storage and the second storage.

(Supplementary Note 19)

A method of manufacturing a semiconductor device, including a substrate processing process of processing a substrate by executing a predetermined recipe, the substrate processing process including: receiving request data from a terminal apparatus; searching one of a first storage and a second storage based on the received request data; and acquiring information of a processing apparatus corresponding to the contents of the request data by using at least one selected from the group of the first storage and the second storage.

(Supplementary Note 20)

A processing system including: a first client configured to be capable of being connected to a processing apparatus; a second client located at a position away from the first client; and a management apparatus configured to be capable of receiving request data from the first client or the second client, searching one of a first storage and a second storage based on the received request data, and acquiring information of the processing apparatus corresponding to the contents of the request data by using at least one selected from the group of the first storage and the second storage.

According to the present disclosure in some embodiments, even when requests from a plurality of clients (terminal apparatuses) are concentrated, it is possible to remotely monitor a group of semiconductor manufacturing apparatuses while reducing a decrease of a response to each client.

While certain embodiments have been described, these embodiments have been presented by way of example, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A management apparatus comprising:
a first storage configured to be capable of storing a request for requesting information about a processing apparatus;
a second storage configured to be capable of receiving the information about the processing apparatus corresponding to the request, from the processing apparatus, and storing the information; and a controller configured to be capable of:
upon receiving a received request from a terminal apparatus, searching the second storage based on the received request,
upon searching the second storage, if information corresponding to the received request about the processing apparatus is stored in the second storage, acquiring the information corresponding to the received request,
upon searching the second storage, if the information corresponding to the received request is not stored in the second storage, searching the first storage to check whether a previously stored request, which is a same request as the request, exists in the first storage, and
upon checking whether the previously stored request exists in the first storage, if the previously stored request does not exist in the first storage, adding the received request in the first storage.

2. The management apparatus of claim 1, wherein the controller is configured to be capable of responding to the terminal apparatus if the information corresponding to the received request is stored in the second storage.

3. The management apparatus of claim 2, wherein if the information corresponding to the received request is not stored in the second storage, the controller is configured to be capable of requesting, from the processing apparatus the information corresponding to the received request and responding to the terminal apparatus.

4. The management apparatus of claim 1, wherein if the previously stored request does not exist in the first storage, the controller is configured to acquire head request in the first storage.

5. The management apparatus of claim 4, wherein the controller is configured to extract the head request from a plurality of requests stored in the first storage and transmit an extracted head request to the processing apparatus and acquire a result corresponding to the request to save the acquired result in the second storage.

6. The management apparatus of claim 1, wherein if the previously store request exists in the first storage, the controller is configured to combine the received request into the previously stored request.

7. The management apparatus of claim 2, wherein when acquiring event information from the processing apparatus, the controller is configured to check whether or not the information stored in the second storage is an outdated event information and discard the information if the information is the outdated event information.

8. The management apparatus of claim 1, wherein when acquiring event information from the processing apparatus, the controller is configured to check whether or not the request stored in the first storage is outdated event information and delete the request if the request is the outdated event information.

9. The management apparatus of claim 1, further comprising:
a table in which a priority is set for each type of the request,
wherein the controller is configured to change an order in which the controller requests the processing apparatus for the request in the first storage according to the priority.

10. The management apparatus of claim 9, wherein the controller is configured to raise, by one, the priority of the request whose order of request to the processing apparatus is postponed, among the request in the first storage.

11. The management apparatus of claim 9, wherein the request is selected from at least one selected from the group of a file list acquisition request for displaying a file list of the apparatus, a file acquisition request from the apparatus according to a user instruction, a log file acquisition request, and a file transmission request to the apparatus.

12. The management apparatus of claim 11, wherein the log file is selected from at least one selected from the group of a screenshot created by the apparatus, a communication log that saves communication of the apparatus, an event log that saves an operating status and events of the apparatus, and an error log that saves error information that occurred.

13. The management apparatus of claim 1, wherein the controller is configured to retain a user/password authentication at a time of connection with the terminal apparatus.

14. The management apparatus of claim 1, wherein the controller is configured to include a first storage provided in a task queue that stores a plurality of request for each connected processing apparatus.

15. A method of processing data, comprising:
storing a request for requesting information about a processing apparatus, in a first storage;
receiving the information about the processing apparatus corresponding to the request, from the processing apparatus, and storing the information in a second storage;
upon receiving a received request from a terminal apparatus, searching the second storage based on the received request;
upon searching the second storage, if information corresponding to the received request about the processing apparatus is stored in the second storage, acquiring the information of corresponding to the received request;
upon searching the second storage, if the information corresponding to the received request is not stored in the second storage, searching the first storage to check whether a previously stored request, which is a same request as the received request, exists in the first storage; and
upon checking whether the previously stored request exists in the first storage, if the previously stored request does not exist in the first storage, adding the received request in the first storage.

16. A non-transitory computer-readable storage medium storing a program that causes a management apparatus to perform a process comprising the method of claim 15.

17. A method of manufacturing a semiconductor device, including a substrate processing process of processing a substrate by executing a predetermined recipe, the substrate processing process comprising the method of claim 15.

18. A processing system comprising:
a first storage configured to be capable of storing a request for requesting information about a processing apparatus;
a second storage configured to be capable of receiving the information about the processing apparatus corresponding to the request, from the processing apparatus, and storing the second information; and
a management apparatus configured to be capable of:
upon receiving a received request from a terminal apparatus, searching the second storage based on the received request,
upon searching the second storage, if information corresponding to the received request about the processing apparatus is stored in the second storage, acquiring the information corresponding to the received request, upon searching the second storage, if the information corresponding to the received request is not stored in the second storage, searching the first storage to check whether a previously stored request, which is a same request as the request, exists in the first storage, and upon checking whether the previously stored request exists in the first storage, if the previously stored request does not exist in the first storage, adding the request in the first storage.

19. The processing system of claim 18, further comprising:

a first client configured to be capable of being connected to the processing apparatus; and a second client located at a position away from the first client, wherein the management apparatus is configured to be capable of:

receiving the request for requesting the information about the processing apparatus from the first client or the second client, upon receiving the request from the first client or the second client, searching the second storage based on the request, upon searching the second storage, if the information about the processing apparatus corresponding to the request is stored in the second storage, acquiring the information about the processing apparatus corresponding to the request, upon searching the second storage, if the information about the processing apparatus is not stored in the second storage, searching the first storage to check whether an other previously stored request, which is a same request as the request, exists in the first storage, and upon checking whether the other previously stored request exists in the first storage, if the other previously stored request does not exist in the first storage, adding the request in the first storage.

\* \* \* \* \*